C. FÉRY.
ELECTRIC CELL.
APPLICATION FILED FEB. 19, 1918.

1,356,977.

Patented Oct. 26, 1920.

INVENTOR:
Charles Féry,
By his Attys.
Fraser, Dark & Myers

UNITED STATES PATENT OFFICE.

CHARLES FÉRY, OF PARIS, FRANCE.

ELECTRIC CELL.

1,356,977.  Specification of Letters Patent.  Patented Oct. 26, 1920.

Application filed February 19, 1918. Serial No. 218,165.

*To all whom it may concern:*

Be it known that I, CHARLES FÉRY, a citizen of the Republic of France, residing at Paris, France, have invented certain new and useful Improvements in Electric Cells, of which the following is a specification.

The "local action" on open circuit in the case of the majority of cells is due to the convection of the liquid around the negative electrode, usually consisting of zinc. Now the zinc salt thus formed has a greater density than that of the exciting liquid, and this produces a continuous renewal of the exciting liquid around the negative electrode.

Moreover with the present form of the zinc electrodes which are immersed vertically in the liquid, it can be remarked that it is at the surface of the liquid that the zinc disintegrates or wears away. This is due to the presence of the oxygen of the air, which accelerates dissolving of the zinc at this point.

The presence of the zinc at the surface of the liquid has also the disadvantage of absorbing the oxygen which dissolves in the liquid and contributes to depolarize the carbon electrode.

It should be added that the diffusion of the zinc salts at the upper part of the liquid has the further detrimental effect of forming oxy salts in the pores of the positive carbon electrode, which salts foul this electrode by the formation of crystals or by the formation of zinc hydrate.

The zinc salts formed during normal working of the cell tend by their density to form into a layer at the bottom of the cell vessel.

If therefore the negative electrode is placed horizontally at the bottom of the vessel the entire surface of the zinc will be in a liquid of uniform constitution and local action will be avoided.

On the other hand the upper part of the positive electrode which occupies the remainder of the height of the liquid will never be in contact with the saturated zincic solution thus formed, and as its porosity will remain good, depolarization will be rapid.

Figure 1:
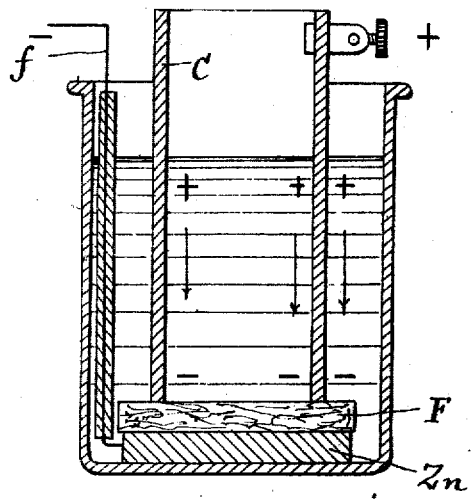

To take a specific case, if we take the zinc, carbon, ammonium chlorid cell, to apply the conditions set out above, this cell will be constituted as follows and is illustrated in the accompanying drawing, wherein; Figure 1 is a vertical sectional view of such a cell; and Fig. 2 is a plan view of a modified form of carbon electrode.

The zinc plate Zn (Fig. 1) placed in the bottom of the vessel is insulated from the carbon cylinder C by a felt disk or ring F or by a cruciform or other suitable piece of ebonite or any other insulating material. The contact with this plate of zinc is made by a wire $f$ insulated for its entire vertical portion by gutta percha or other insulating material.

During the working of the cell a litmus or turmeric paper occupying the entire depth of the vessel will show that the liquid below the felt becomes acid, chlorid of zinc being formed there. On the other hand the light liquid occupying the upper portion of the cell becomes alkaline, as it contains the ammonia of the exciting salt. The ammonia gas can therefore be liberated freely and without encountering the chlorid of zinc, with which it would form the well known crystals of ordinary sal ammoniac cells.

Figure 2:
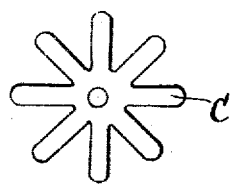

The tubular electrode C may evidently be replaced by a piece of carbon having wings or ribs or with parallel plates, with the object of increasing the depolarizing surface of the positive electrode (Fig. 2.)

The bottom of the positive electrode being at a very small distance from the negative, the electric resistance of the cell is very low.

It is further to be observed that the fail of the liquid level in the vessel in consequence of evaporation does not cause the surface of the electrodes in presence of each other to vary as in the usual construction.

Rapid depolarization of cells of the present construction arises from electric currents which are generated between the top and the bottom of the carbon electrode.

Referring to Fig. 1, it will be remarked that after working, the bottom of the positive (carbon) electrode is much polarized, while the top, bathed by a liquid in contact with the air, is very little polarized. Consequently an electric current is established between these two points, and the strength of which regulates the depolarization.

The strength of these currents is further increased by the fact that the positive electrode is in contact in its height with liquids of different densities and consequently of different constitutions.

In order that this depolarization may be rapid the horizontal section of the liquid should also be great.

Claims:

1. An electric cell, comprising a vessel, an exciting liquid, a soluble negative electrode situated horizontally at the bottom of said vessel, said electrode being entirely covered by the exciting liquid, a liquid layer of greater density than the exciting liquid, saturated with ions or salts of the same metal as the soluble electrode covering said negative electrode, said layer of liquid of greater density being immobilized by its weight at the bottom of the vessel and being of substantially uniform constitution, whereby convection currents of the liquid covering the soluble electrode are avoided, and thereby avoiding "local action" upon the soluble electrode, and a positive electrode located mainly outside of the dense liquid layer at the bottom of the vessel, whereby deposition of salts upon the positive electrode, crystallizing out of the solution is avoided, and thereby the surface of the positive electrode, left uncovered with solid depolarizing elements and the conditions for the depolarization action occurring between different parts of the positive electrode maintained at a maximum.

2. An electric cell, comprising a vessel, an exciting liquid, a soluble negative electrode situated horizontally at the bottom of said vessel, said electrode being entirely covered by the exciting liquid, a liquid layer of greater density than the exciting liquid, saturated with ions or salts of the same metal as the soluble electrode covering said negative electrode, said layer of liquid of greater density being immobilized by its weight at the bottom of the vessel and being of substantially uniform constitution, whereby convection currents of the liquid covering the soluble electrode are avoided, and thereby avoiding "local action" upon the soluble electrode, and a vertically arranged positive electrode having its lower end near the electrode and its top in contact with the air, whereby the electric current, generated between the top and bottom of the positive electrode, serve to equalize its potential and depolarize it, said positive electrode being located mainly outside of the dense liquid layer at the bottom of the vessel, whereby deposition of salts upon the positive electrode, crystallizing out of the solution is avoided, and thereby the surface of the positive electrode, left uncovered with solid depolarizing elements and the conditions fo the depolarization action occurring between different parts of the positive electrode maintained at a maximum.

3. An electric cell, comprising a vessel, an ammonium chlorid exciting liquid, a zinc electrode situated horizontally at the bottom of said vessel, said zinc electrode being entirely covered by the exciting liquid, a liquid layer of greater density than the exciting liquid, saturated with zinc chlorid covering said zinc electrode, said layer of liquid of greater density being immobilized by its weight at the bottom of the vessel and being of substantially uniform constitution, whereby convection currents of the liquid covering the zinc electrode are avoided, and thereby avoiding "local action" upon the zinc electrode, and a carbon electrode located mainly outside of the dense liquid layer at the bottom of the vessel, whereby deposition of zinc salts upon the carbon electrode crystallizing out of the saturated zinc chlorid solution, is avoided, and thereby the surface of the carbon electrode left uncovered with solid depolarizing elements and the conditions for the depolarization action occurring between different parts of the carbon electrode maintained at a maximum.

4. An electric cell, comprising a vessel, an ammonium chlorid exciting liquid, a flat zinc electrode situated horizontally at the bottom of said vessel, said zinc electrode being entirely covered by the exciting liquid, a liquid layer of greater density than the exciting liquid, saturated with zinc chlorid covering said zinc electrode, said layer of liquid of greater density being immobilized by its weight at the bottom of the vessel and being of substantially uniform constitution, whereby convection currents of the liquid covering the zinc electrode are avoided, and thereby avoiding "local action" upon the zinc electrode, and a tubular carbon electrode arranged perpendicular to said zinc electrode, and a strip of porous insulating material between the zinc and carbon electrodes, said carbon electrode being located mainly outside of the dense liquid layer at the bottom of the vessel, whereby deposition of zinc salts upon the carbon electrode crystallizing out of the saturated zinc chlorid solution, is avoided, and thereby the surface of the carbon electrode left uncovered with solid depolarizing elements and the conditions for the depolarization action occurring between different parts of the carbon electrode maintained at a maximum.

In witness whereof, I have hereunto signed my name in the presence of two subscribing witnesses.

CHARLES FÉRY.

Witnesses:
CHAS. P. PRESSLY,
RENÉ BARDY.